US010126860B2

(12) United States Patent
Yang et al.

(10) Patent No.: US 10,126,860 B2
(45) Date of Patent: Nov. 13, 2018

(54) TOUCH DISPLAY PANEL AND METHOD FOR FORMING THE SAME, RELATED DRIVING METHOD AND TOUCH DISPLAY APPARATUS CONTAINING THE SAME

(71) Applicants: BOE TECHNOLOGY GROUP CO., LTD, Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Hailin Xue, Beijing (CN); Haisheng Wang, Beijing (CN); Xiaochuan Chen, Beijing (CN); Yingming Liu, Beijing (CN); Weijie Zhao, Beijing (CN); Rui Xu, Beijing (CN); Lei Wang, Beijing (CN); Changfeng Li, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 45 days.

(21) Appl. No.: 15/122,856

(22) PCT Filed: Dec. 28, 2015

(86) PCT No.: PCT/CN2015/099128
§ 371 (c)(1),
(2) Date: Aug. 31, 2016

(87) PCT Pub. No.: WO2017/028453
PCT Pub. Date: Feb. 23, 2017

(65) Prior Publication Data
US 2017/0185209 A1    Jun. 29, 2017

(30) Foreign Application Priority Data

Aug. 18, 2015 (CN) .......................... 2015 1 0508046

(51) Int. Cl.
*G06F 3/041* (2006.01)
*G06F 3/044* (2006.01)
*G06F 1/32* (2006.01)

(52) U.S. Cl.
CPC .......... *G06F 3/0416* (2013.01); *G06F 1/3262* (2013.01); *G06F 3/044* (2013.01); *G06F 3/0412* (2013.01); *G06F 2203/04103* (2013.01)

(58) Field of Classification Search
CPC ...... G06F 3/0412; G06F 3/0416; G06F 3/044; G06F 1/3262; G06F 2203/04103
(Continued)

(56) References Cited

U.S. PATENT DOCUMENTS 9,477,361 B2 * 10/2016 Zhao .................... G06F 3/0412
2001/0019373 A1 * 9/2001 Kobayashi ........ G02F 1/136213
349/39
(Continued)

FOREIGN PATENT DOCUMENTS

CN    102841718 A    12/2012
CN    103197819 A    7/2013
(Continued)

OTHER PUBLICATIONS

State Intellectual Property Office of the P.R.C (SIPO) Office Action 1 for 201510508046.9 dated Sep. 4, 2017 21 Pages (including translation).
(Continued)

*Primary Examiner* — Stephen G Sherman
(74) *Attorney, Agent, or Firm* — Anova Law Group, PLLC

(57) ABSTRACT

A touch display panel. The touch display panel includes a first substrate; a plurality of data lines; and a plurality of gate (Continued)

lines. The touch display panel also includes a plurality of subpixel regions arranged in an array defined by the plurality of data lines and the plurality of gate lines on the first substrate, each subpixel region including a common electrode pattern; a plurality of touch-driving electrodes, each formed by electrically connected common electrode patterns corresponding to at least one row of subpixel regions; and a plurality of touch-sensing electrodes. The plurality of touch-driving electrodes and the touch-sensing electrodes are for detecting a touch motion on the touch display panel.

19 Claims, 5 Drawing Sheets

(58) Field of Classification Search
USPC .................................. 345/174; 178/18.06
See application file for complete search history.

(56) References Cited

U.S. PATENT DOCUMENTS

2011/0128253 A1    6/2011  Yoon et al.
2014/0168150 A1    6/2014  Kim et al.
2015/0153877 A1    6/2015  Han et al.
2016/0041438 A1*   2/2016  Hu ..................... G09G 3/3648
                                                           345/174
2016/0282990 A1*   9/2016  Kimura ............... G02F 1/13338

FOREIGN PATENT DOCUMENTS

| CN | 203178995 U | 9/2013 |
| CN | 103698949 A | 4/2014 |
| CN | 103699284 A | 4/2014 |
| CN | 103870057 A | 6/2014 |
| CN | 203786433 U | 8/2014 |
| CN | 104679327 A | 6/2015 |
| CN | 105094488 A | 11/2015 |

OTHER PUBLICATIONS

The World Intellectual Property Organization (WIPO) International Search Report for PCT/CN2015/099128 dated May 19, 2016, p. 1-5.

* cited by examiner

TOUCH DISPLAY PANEL AND METHOD FOR FORMING THE SAME, RELATED DRIVING METHOD AND TOUCH DISPLAY APPARATUS CONTAINING THE SAME

CROSS-REFERENCES TO RELATED APPLICATIONS

This application is a national phase entry under 35 U.S.C. § 371 of International Application No. PCT/CN2015/099128, filed on Dec. 28, 2015, which claims priority to Chinese Patent Application No. 201510508046.9 filed on Aug. 18, 2015. The above enumerated patent applications are incorporated by reference herein in their entirety.

FIELD OF THE INVENTION

The present invention generally relates to the display technologies and, more particularly, relates to a touch display panel and a method for forming the same, a related driving method and a related touch display apparatus.

BACKGROUND

Capacitive touch display screens are among the new generations of touch display panels developed after the resistive touch display screens. The performance of the capacitive touch display screens has been greatly improved compared to the products of last generation, e.g., resistive touch display screens. Capacitive touch display screens often have short response time and support multi-touch functions, which greatly improves the playability and operability of the touch products. Projected capacitive touch screens often include electrode patterns formed by etching of two conductive glass coatings. The electrode patterns may be distributed along two perpendicular directions, e.g., a horizontal direction and a vertical direction, and form intersections. An intersection formed by the pattern distributed along the horizontal direction and the pattern distributed along the vertical direction forms a capacitive node. One of the electrode patterns is used as a driving electrode, and the other electrode pattern is used as a touch-sensing electrode. When electric current flows through the driving electrode, signals reflecting capacitance change from the outside environment cause the capacitance to change on the capacitive nodes of the touch-sensing electrode. By detecting the change of capacitance on the capacitive nodes using a touch-sensing device connected to the touch-sensing electrode, the location of the touch motion can be determined.

Existing touch display screens are mainly on-cell touch display screens. That is, the touch-sensing device of the touch display screen is often directly mounted in front of the display screen. However, an existing on-cell touch display screen often requires a touch-sensing film to be formed on the display screen. The existing on-cell touch display screens have high fabrication cost and are thick in volume.

BRIEF SUMMARY OF THE DISCLOSURE

The present disclosure provides a touch display panel and the method for forming the touch display panel, a related driving method, and a touch display apparatus containing the touch display panel. Using the touch display panel, the fabrication of the touch display screen may be less costly and the thickness of the touch display screen may be reduced.

One aspect of the present disclosure includes a touch display panel. The touch display panel includes a first substrate; a plurality of data lines; and a plurality of gate lines. The touch display panel also includes a plurality of subpixel regions arranged in an array defined by the plurality of data lines and the plurality of gate lines on the first substrate, each subpixel region including a common electrode pattern; a plurality of touch-driving electrodes, each formed by electrically connected common electrode patterns corresponding to at least one row of subpixel regions; and a plurality of touch-sensing electrodes. The plurality of touch-driving electrodes and the touch-sensing electrodes are for detecting a touch motion on the touch display panel.

Optionally, the plurality of touch-sensing electrodes and the plurality of touch-driving electrodes are distributed in different layers and are electrically insulated from each other, an orthogonal projection of the plurality of touch-sensing electrodes on the first substrate intersecting with an orthogonal projection of the plurality of touch-driving electrodes on the first substrate.

Optionally, common electrode patterns in one touch-driving electrode are electrically connected through a conductive line; and each common electrode pattern is connected to the conductive line through a via hole, the via hole being formed in an insulating layer between the touch-driving electrode and the conductive line.

Optionally, the conductive line is a common electrode line for transmitting common electrode signals to a corresponding touch-driving electrode in the display period of one frame.

Optionally, a position of each via hole corresponds to a same location on each common electrode pattern, the via holes corresponding to the common electrode patterns according to a one-to-one relation.

Optionally, the common electrode lines are parallel to the gate lines; and an orthogonal projection of a common electrode line on the first substrate is between an orthogonal projection of two adjacent common electrode patterns on the first substrate, the orthogonal projection of the common electrode line on the first substrate being separate from an orthogonal projection of a gate line on the first substrate.

Optionally, the gate lines and the common electrode lines are in a same layer and made of a same material.

Optionally, common electrode patterns in at least one touch-driving electrode are connected through connecting structures.

Optionally, two connecting structures are each positioned at one end of the two adjacent common electrode patterns and between the two adjacent common electrode patterns for connecting the two adjacent common electrode patterns.

Optionally, the connecting structures and the common electrode patterns are in a same layer and made of a same material.

Optionally, the touch display panel further includes a second substrate facing the first substrate, the plurality of touch-sensing electrodes being distributed on the second substrate.

Optionally, the touch display panel further includes a processing unit for providing the common electrode signal and the touch-driving signal, and determining a location of the touch motion.

Another aspect of the present disclosure provides a method for fabricating a touch display panel. The method includes forming a plurality of data lines and a plurality of gate lines on the first substrate. A plurality of subpixel regions arranged in an array are defined by the plurality of data lines and the plurality of gate lines, each subpixel region including a common electrode pattern, and common electrode patterns corresponding to at least one row of subpixel regions being electrically connected to form a touch-driving electrode. The method also includes forming a plurality of touch-sensing electrodes. The plurality of touch-sensing electrodes and a plurality of touch-driving electrodes are distributed in different layers and are electrically insulated from each other, an orthogonal projection of the plurality of touch-sensing electrodes on the first substrate intersecting with an orthogonal projection of the plurality of touch-driving electrodes on the first substrate.

Optionally, the method further includes forming a plurality of conductive lines; forming an insulating layer on the first substrate that includes the plurality of conductive lines and the plurality of gate lines; and forming via holes in the insulating layer. The method also includes forming common electrode patterns on the insulating layer that includes the via holes, the common electrode patterns being connected to the conductive lines through the via holes; and forming the plurality of data lines on the first substrate that includes the common electrode patterns.

Optionally, the method further includes forming via holes in the insulating layer, a position of each via hole corresponds to a same location on each common electrode pattern, the via holes corresponding to the common electrode patterns according to a one-to-one relation.

Optionally, the conductive lines are common electrode lines.

Optionally, the common electrode lines are parallel to the gate lines; and an orthogonal projection of a common electrode line on the first substrate is between an orthogonal projection of two adjacent common electrode patterns on the first substrate, the orthogonal projection of a common electrode line on the first substrate having no overlap with an orthogonal projection of a gate line on the first substrate.

Optionally, the common electrode lines and the gate lines are fabricated through a same patterning process.

Optionally, the method further includes forming connecting structures in a same patterning process as the common electrode patterns. Common electrode patterns corresponding to at least one row of subpixel regions are connected through connecting structures; and two connecting structures are each positioned at one end of the two adjacent common electrode patterns and between the two adjacent common electrode patterns for connecting the two adjacent common electrode patterns.

Optionally, the method further includes providing a second substrate facing the first substrate. The plurality of touch-sensing electrodes is fabricated on the second substrate.

Another aspect of the present disclosure provides a method for driving the disclosed touch display panel. The method includes the processing unit dividing a frame into at least one display period and at least one touch period; in a display period, the processing unit applying a common electrode signal on the touch-driving electrodes; and in a touch period, the processing unit applying a touch-driving signal on the touch-driving electrodes and determining locations of touch motions by detecting capacitance change on the touch-sensing electrodes.

Another aspect of the present disclosure provides a touch display apparatus. The touch display apparatus includes one or more of the disclosed touch display panel.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

For those skilled in the art to better understand the technical solution of the invention, reference will now be made in detail to exemplary embodiments of the invention, which are illustrated in the accompanying drawings. Wherever possible, the same reference numbers will be used throughout the drawings to refer to the same or like parts.

It should be noted that, the rows and columns described in the embodiments are relative. In the embodiments of the present disclosure, the rows are arranged along the horizontal direction or row direction, i.e., the transverse direction. The columns are arranged along the vertical direction or column direction, i.e., the longitudinal direction. However, because the subpixels are arranged in an array, when the subpixels are viewed from different directions, the rows and the columns may switch, and the transverse direction and the longitudinal direction may also switch.

In addition, the touch display panels illustrated in the embodiments are touch display panels operated under advanced fringe field switching (AFFS) display mode. However, the operating mode should not limit the scope of the present disclosure. The touch display panel may also be operated under other operating modes. In a display device operated under AFFS display mode, the common electrodes and the pixel electrodes, in the same plane, generate fringe electric field so that the liquid crystal molecules rotate in a plane parallel to the plane of the substrate. Because the display device operated under AFFS display mode enables the liquid crystal molecules to rotate in a plane parallel to the substrate, the brightness level and the color contrast of the display device can be greatly improved. The display device can have wider viewing angles and ripple effect can be avoided or prevented. Thus, display device operated under AFFS display mode are products with great outlook.

Figure 1:
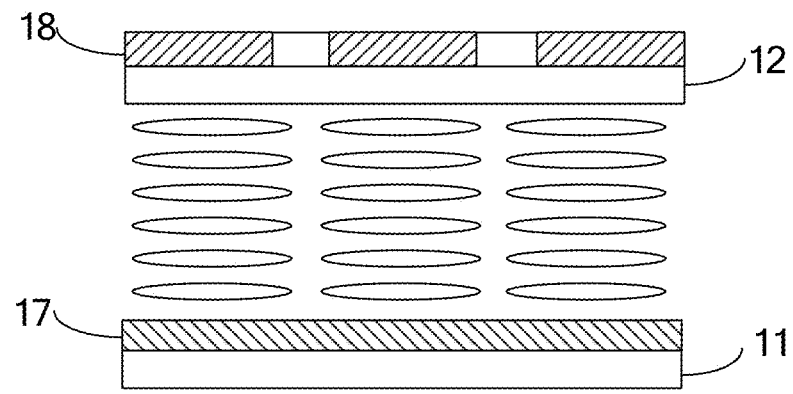
FIG. 1 illustrates an exemplary touch display panel according to the embodiments of the present disclosure.
Figure 2:
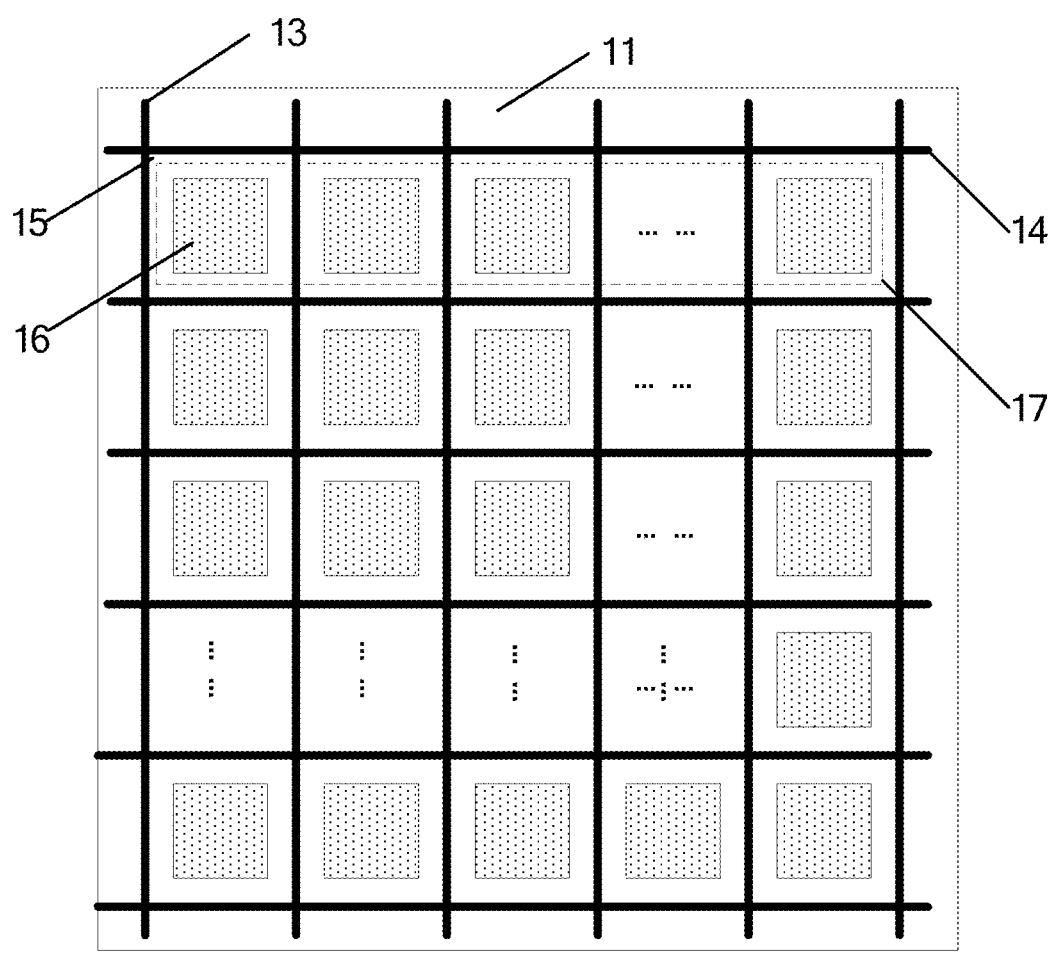
FIG. 2 illustrates exemplary touch-driving electrodes according to the embodiments of the present disclosure.

One aspect of the present disclosure provides a touch display panel. As shown in FIGS. 1 and 2, the touch display panel may include a first substrate 11, and a plurality of data lines 13 and a plurality of gate lines 14 on the first substrate 11. The touch display panel also includes a plurality of subpixel regions 15 defined by the plurality of data lines 13 and the plurality of gate lines 14. Each subpixel region 15 may include a common electrode pattern 16. At least two common electrode patterns 16 corresponding to two subpixel regions 15 in one row may be electrically connected together to form a touch-driving electrode 17. For illustrative purposes, FIG. 2 shows the common electrode patterns 16 corresponding to one row of subpixel regions 15 being electrically connected to form the touch-driving electrode 17, indicated by the dashed line box.

The touch display panel may also include touch-sensing electrodes 18, distributed in a different layer from the touch-driving electrodes 17. For example, as shown in FIG. 1, the touch-sensing electrodes 18 may be positioned above the touch-driving electrodes 17. The touch-sensing electrodes 18 and the touch-driving electrodes 17 may be insulated from each other. The direction along which the touch-sensing electrodes 18 aligned and the direction along which the touch-driving electrodes 17 aligned may be perpendicular to each other. The touch-sensing electrodes 18 and the touch-driving electrodes 17 may be intersecting with each other. It should be noted that, in the disclosure, the term "intersect" does not imply the intersecting objects are connected or disconnected. The term "intersect" is only used to describe the directions along which two or more objects are aligned from a certain viewing angle or direction. For example, the touch-sensing electrodes 18 and the touch-driving electrodes 17 may be viewed as intersecting each other from a direction perpendicular to the plane on which the touch-sensing electrodes 18 and the touch-driving electrodes 17 are distributed. That is, the orthogonal projection of the touch-sensing electrodes 18 on the first substrate 11 intersects with the orthogonal projection of the touch-driving electrodes 17 on the first substrate 11.

In a display period of one frame, a common electrode signal may be loaded on the touch-driving electrodes 17. In a touch period of one frame, a touch-driving signal may be loaded on the touch-driving electrodes 17. The display period may refer to a time period, in a frame, used for only displaying images. The touch period may refer to a time period, in a frame, used for sensing touch motions. During the touch period, the touch display panel may or may not display images.

It should be noted that, in FIG. 2, the embodiment is illustrated using the touch-driving electrode 17 formed by the common electrode patterns 16 corresponding to a row of subpixel regions 15, shown as the dashed line box. In practice, for high display resolutions, the size of a subpixel region is often designed to be sufficiently small. As such, the size of a common electrode pattern 16 is also sufficiently small. If the common electrode pattern 16 corresponding to a row of subpixel regions 15 are electrically connected to form a touch-driving electrode 17, when a finger or a conductive stylus is touching the touch display panel, the finger or the conductive stylus may simultaneously touch multiple touch-driving electrodes 17. The touch performance of the touch display panel may be adversely affected. Thus, in some embodiments, a width of a touch-driving electrode 17 along the column direction may be about 4 to 6 mm. The number of rows of common electrode patterns 16 included in a touch-driving electrode 17 may be determined according to the physical resolution of the touch display panel. A greater resolution the touch display panel has, the more rows of common electrode patterns are included in a touch-driving electrode. The lower resolution the touch display panel has, the fewer rows of common electrode patterns are included in a touch-driving electrode.

Further, in some embodiments, as shown in FIG. 1, the touch display panel may include a second substrate 12 facing the first substrate 11. The touch-sensing electrodes 18 may be positioned on the second substrate 12. The touch-sensing electrodes 18 may be arranged along a direction perpendicular to the direction the touch-sensing electrodes 17 are arranged. Specifically, the touch-sensing electrodes 18 may be positioned on one side of the second substrate 12, where that side is facing the first substrate 11. The touch-sensing electrodes 18 may also be positioned on the side of the second substrate 12 facing away from the first substrate 11.

The touch display panel may further include a processing unit for controlling the operation of the touch display panel. For example, the processing unit may send and receive certain signals to the touch display panel for driving the subpixels and configuring a touch motion.

The disclosed touch display panel may include a first substrate. The first substrate may include a plurality of data lines and a plurality of gate lines. The plurality of data lines and the plurality of gate lines may be configured to define or form a plurality of subpixel regions arranged in an array. A common electrode pattern may be formed in a subpixel region. At least two common electrode patterns corresponding to two subpixel regions in one row may be electrically connected to form a touch-driving electrode. In some embodiments, at least common electrode patterns corresponding to subpixel regions of one row may be electrically connected to form a touch-driving electrode. The touch display panel may also include a plurality of touch-sensing electrodes. The touch-sensing electrodes may be arranged to be intersecting with the touch-driving electrodes and may be electrically insulated from the touch-driving electrodes. The disclosed touch display panel may further include a second substrate facing the first substrate. The touch-sensing electrodes may be distributed on the second substrate and the touch-driving electrodes may be distributed on the first substrate. In a display period of one frame, a common electrode signal may be applied on the touch-sensing electrodes by the processing unit. In a touch period of one frame, a touch-driving signal may be applied on the touch-sensing electrode by the processing unit. That is, in the embodiments of the present disclosure, the common electrodes may be used as touch-sensing electrodes. The fabrication cost of the touch display panel may be reduced, and the resulting touch display panel may be thinner.

Figure 3:
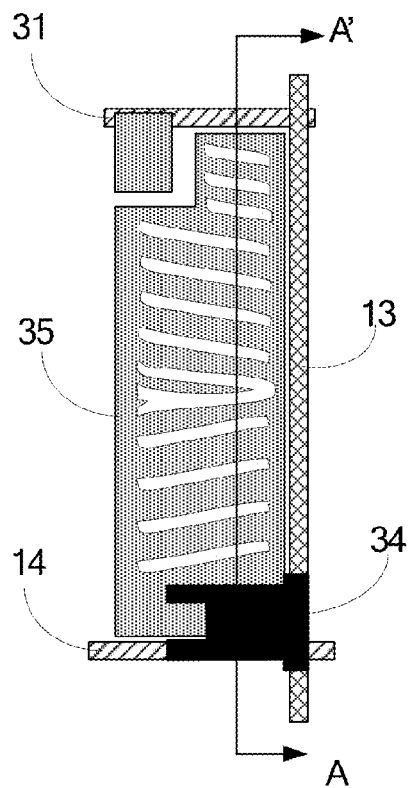
FIG. 3 illustrates a top view of a first substrate according to the embodiments of the present disclosure.
Figure 4:
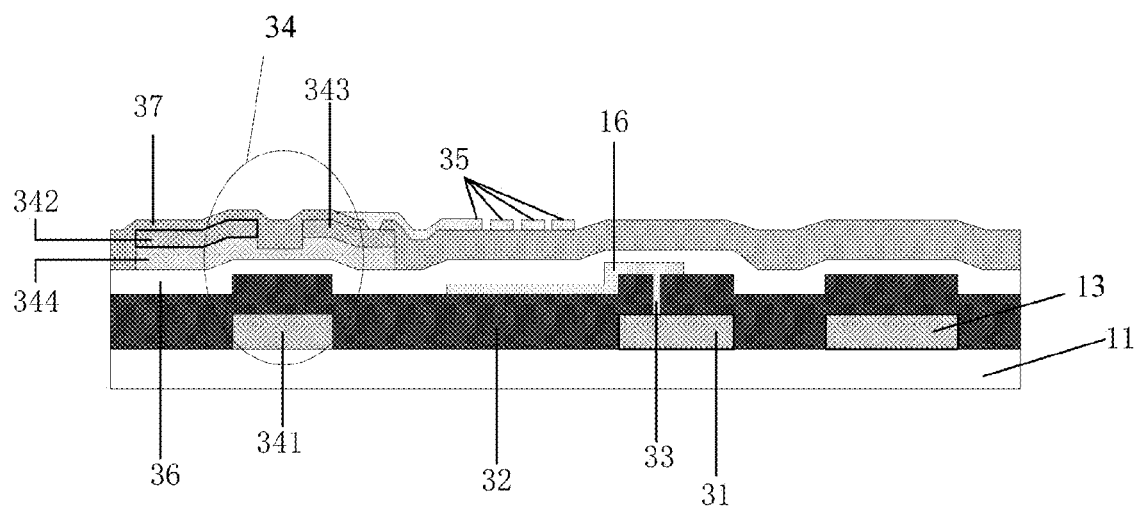
FIG. 4 illustrates a cross-sectional view of the first substrate along the A-A' direction in FIG. 3.

In some embodiments, as shown in FIGS. 3 and 4, common electrode patterns 16 corresponding to at least one row of subpixel regions 15 may be electrically connected by conductive line 31. An insulating layer 32 may be positioned between the touch-driving electrode 17 and the conductive line 31. Each common electrode pattern 16 of the touch-driving electrode 17 may be connected to the corresponding conductive line 31 through the via hole 33 in the insulating layer 32.

Specifically, as shown in FIGS. 3 and 4, the first substrate may also include thin-film transistors (TFTs) 34 and pixel electrodes 35. For illustrative purposes, only one TFT 34 and only one pixel electrode 35 are shown. The TFT 34 may include a gate 341, a source 342, a drain 343, and a source 344. Further, the first substrate may also include a gate insulating layer 36 covering the gate 341, and a passivation layer 37 covering the source 342 and drain 343. The pixel electrode 35 may be a comb-shaped slit electrode. The gate 341 may be connected to the gate line 14. The source 342 may be connected to the data line 13. The drain 343 may be connected to the pixel electrode 35.

In the embodiments described above, the insulating layer 32 may be positioned between the touch-driving electrode 17 and the data line 13. The insulating layer 32 may also be positioned between the touch-driving electrode 17 and the gate line 14. Thus, capacitance between the touch-driving electrode 17 and the gate line 14, and capacitance between the touch-driving electrode 17 and the data line 13 may be reduced. The sensitivity to touch motions, of the touch display panel, may be improved. The power consumption of the touch display panel may be reduced.

In some embodiments, the conductive line 31 may be a common electrode line. It should be noted that, in the disclosure, the conductive line 31 may be a common electrode line. That is, the portion of a conductive line in the display region may be a common electrode line. A common electrode line may be used for transmitting common electrode signals to a corresponding touch-driving electrode in a display period of one frame. The conductive lines or common electrode lines may be connected to the processing unit for transmitting common electrode signals in a display period of one frame, and transmitting touch-sensing signals in a touch period of one frame. The conductive lines may be arranged or distributed on the sides of the common electrode patterns or under the common electrode patterns to be connected to the processing unit. The specific arrangement of the conductive lines may be adjusted according to different applications and should not be limited by the embodiments of the present disclosure.

In one embodiment, the conductive lines may be arranged on the side of the common electrode patterns. That is, the common electrode lines of the touch display panel may be used as conductive lines. Alternatively, the conductive lines may be used as common electrode lines of the touch display panel. Compared to fabricating conductive lines and common electrode lines separately, using conductive lines as the common electrode lines (or vice versa) may reduce the number of patterning steps by one. The fabrication of the touch display panel may be simplified. The number of lines or wires in the touch display panel may be reduced, which may further improve the aperture ratio of the touch display panel.

In some embodiments, the via holes 33 may be positioned at substantially the same location on each common electrode pattern 16. Arranging the via hole 33, in the insulating layer 32, to be at substantially the same location on each common electrode pattern 16 may enable the electrical properties of each common electrode pattern 16 to be consistent or same. The display performance of the touch display panel may be uniformed, and the display performance of the touch display panel may be improved.

Further, the common electrode lines 31 may be arranged to be parallel to the gate lines 14. The orthogonal projection of a common electrode line 31 on the first substrate 11 may be between the orthogonal projection of two adjacent common electrode patterns 16 on the first substrate 11. The orthogonal projection of a common electrode line 31 on the first substrate 11 may have no overlap with the orthogonal projection of a gate line 14 on the first substrate 11.

Figure 5:
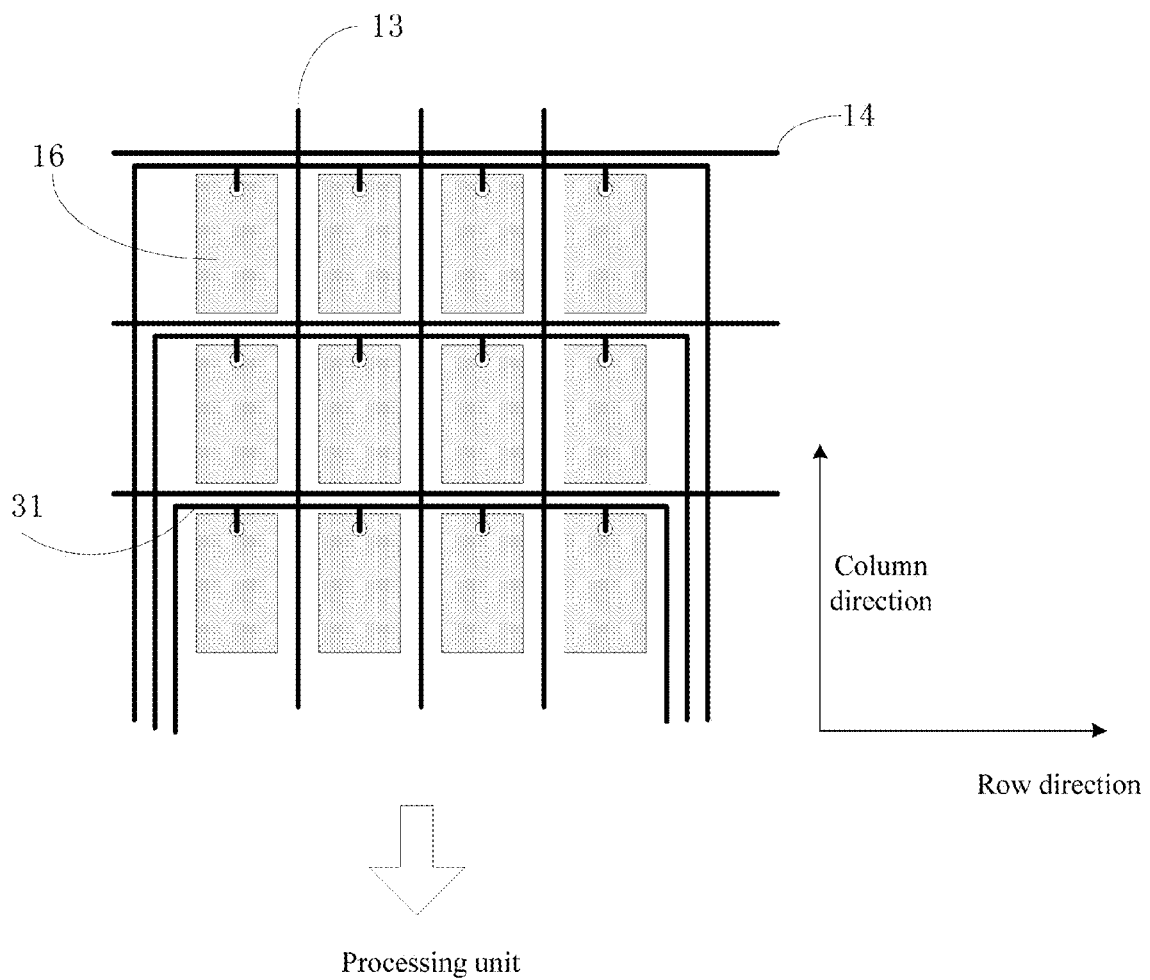
FIG. 5 illustrates an exemplary arrangement of gate lines, data lines, and electrodes according to the embodiments of the present disclosure.

Specifically, as shown in FIG. 5, because the common electrode lines 31 are parallel to the gate lines 14, the common electrode lines 31 may intersect with the data lines 13. The overlapping area at an intersection, of a common electrode line 31 and a data lines 13, may be sufficiently small. Further, because the orthogonal projection of a common electrode line 31 on the first substrate 11 may be between the orthogonal projection of two adjacent common electrode patterns 16 on the first substrate 11, little or no overlapping areas may be formed between the common electrode lines 31 and the gate lines 14. In the embodiments described above, the overlapping area between a common electrode line 31 and a data line 13 may be sufficiently small. A common electrode line 31 may have no or little overlapping area with a gate line 14. The capacitance between the touch-driving electrodes 17 and the gate lines 14 may be reduced. The capacitance between the touch-driving electrodes 17 and the data lines 13 may be reduced. Further, the capacitance between the touch-driving electrodes 17 and the common electrode patterns 16 may also be reduced. The sensitivity of the touch display panel to touch motions may be further improved. The power consumption of the touch display panel may be reduced.

In some embodiments, the gate lines 14 and the common electrode lines 31 may be arranged to be in the same layer and made with a same material. By applying the configuration, i.e., the gate lines 14 and the common electrode lines 31 being in the same layer and being made of a same material, only one patterning process may be required to form the gate lines 14 and the common electrode lines 31. The fabrication process of the touch display panel may be simplified.

Figures 6, 7:
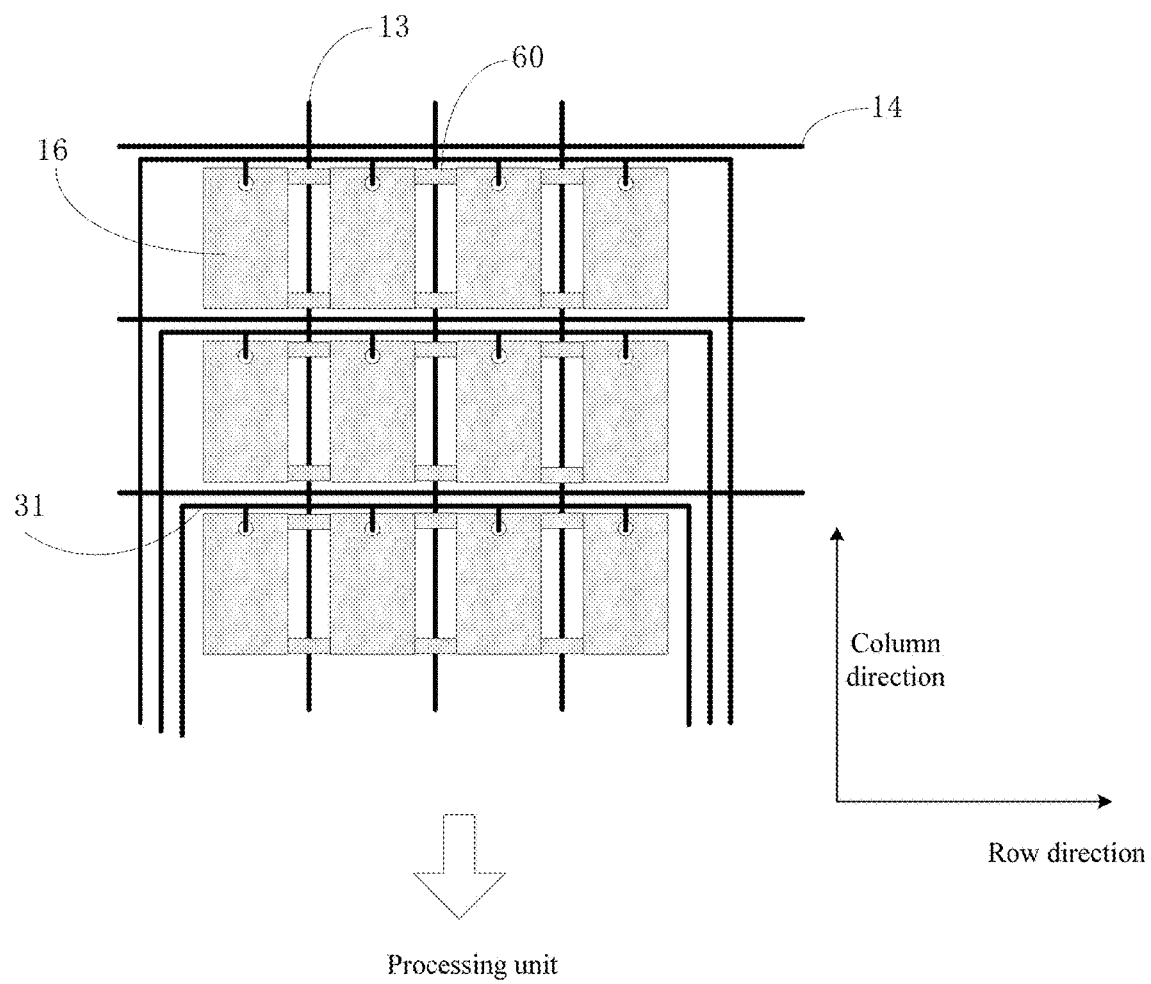
FIG. 6 illustrates another exemplary touch-driving electrode according to the embodiments of the present disclosure.
FIG. 7 illustrates an exemplary process flow for fabricating the touch display panel according to the embodiments of the present disclosure.

In some embodiments, as shown in FIG. 6, the common electrode patterns 16 of at least one row of subpixel regions 15 may be electrically connected to connecting structures 60 through neighboring common electrode patterns 16. Connecting structures may be positioned in the space between two adjacent common electrode patterns 16 along the column direction, i.e., the direction along which the data lines are arranged. As shown in FIG. 6, two connecting structures 60 are each positioned at one end of the two adjacent common electrode patterns 16 between the two adjacent common electrode patterns 16 for connecting the two adjacent common electrode patterns 16 at each end. The connecting structures 60 and the common electrode patterns 16 may be formed in the same layer and made of a same material.

By connecting the common electrode patterns with connecting structures and using the same material for forming the connecting structures and the common electrode patterns, the connecting structures may be formed in the patterning step that the common electrode patterns are formed. The fabrication process to form the touch display panel may be simplified.

Another aspect of the present disclosure provides a method for forming the touch display panel. The method may be used for fabricating the touch display panels in any one of the embodiments described above. Specifically, as shown in FIG. 7, the method may include steps S71 and S72.

In step S71, a plurality of gate lines, a plurality of data lines, and a plurality of common electrode patterns may be formed on the first substrate.

As shown in FIGS. 2, 3, and 4, a first substrate 11 may be provided. The plurality of data lines 13 and the plurality of gate lines 14 may be formed on the first substrate 11 and used to define a plurality of subpixel regions 15 arranged in an array on the first substrate 11. A common electrode pattern 16 may be arranged in each subpixel region 15 to correspond to the subpixel region. The common electrode patterns 16 corresponding to at least one row of subpixel regions may be electrically connected to form a touch-driving electrode 17.

Specifically, the plurality of gate lines 14, the plurality of data lines 13, and the plurality of common electrode patterns 16, formed on the first substrate 11, may be fabricated through a suitable patterning process. For example, the patterning process may often include steps such as cleaning, film formation, photoresist coating, exposure, development, etching, and photoresist stripping. To form a metal film, physical vapor deposition methods may be used. For example, magnetron sputtering may be used to deposit the metal film. A wet etch may be used to form the corresponding patterns. To deposit a non-metal film, chemical vapor deposition methods may be used. A dry etch may be used to form the corresponding patterns.

In step S72, touch-sensing electrodes may be formed in a different layer than the touch-driving electrodes. The touch-driving electrodes and the touch-sensing electrodes may be in different layers and may be electrically insulating from each other. An orthogonal projection of the touch-sensing electrodes on the first substrate may intersect with an orthogonal projection of the of touch-driving electrodes on the first substrate.

In a display period of one frame, a common electrode signal may be applied on a touch-driving electrode 17. In a touch period of one frame, a touch-sensing signal may be applied on the touch-driving electrode 17.

The touch display panel fabricated using the disclosed method may include a first substrate. The first substrate may include a plurality of data lines and a plurality of gate lines. The plurality of data lines and the plurality of gate lines may be configured to define or form a plurality of subpixel regions arranged in an array. A common electrode pattern may be formed in a subpixel region. Common electrode patterns in at least one row of subpixel regions may be electrically connected to form a touch-driving electrode. The touch display panel may also include a plurality of touch-sensing electrodes. The touch-sensing electrodes may be arranged to be intersecting with the touch-driving electrodes and may be electrically insulated from the touch-driving electrodes. In a display period of one frame, a common electrode signal may be applied on the touch-sensing electrodes through corresponding common electrode lines. In a touch period of one frame, a touch-driving signal may be applied on the touch-sensing electrodes. Thus, in the embodiments of the present disclosure, common electrodes or common electrode patterns may be used as touch-driving electrodes. The fabrication cost of the display panel may be reduced, and the touch display panel may be thinner.

Further, in step S71, the process to fabricate the plurality of gate lines, the plurality of data lines, and the plurality of common electrode patterns on the first substrate may include steps S711 to S715.

In step S711, conductive lines 31 and gate lines 14 may be formed on the first substrate 11.

In step S712, an insulating layer 32 may be formed on the first substrate 11 that includes the conductive lines 31 and the gate lines 14.

In step S713, via holes 33 may be fabricated in the insulating layer 32. It should be noted that, the via holes 33 in the insulating layer 32 may be used to form electrical connection between the conductive lines 31 and the corresponding common electrode patterns 16. Thus, in some embodiments, the via holes 33 may be formed in the insulating layer 32 at locations that corresponding to the proper locations of the conductive lines 31.

In step S714, common electrode patterns 16 may be formed on the insulating layer 32 that includes via holes 33. The common electrode patterns 16 may be electrically connected with the conductive lines 31 through the via holes 33.

In step S715, data lines 13 may be formed on the first substrate 11 that includes the common electrode patterns 16.

Further, the method for forming the touch display panel may further include the following steps.

In step S711, gates 341 of the TFTs 34 may be formed with the conductive lines 31 and gate lines 14. That is, the gates 341 of the TFTs 34, the conductive lines 31, and the gate lines 14 may be formed in the same fabrication step. The gates 341 may be electrically connected to the gate lines 14.

Before step S714, a gate insulating layer 36 for covering the common electrode patterns 16 may be formed, and an active layer 344 may be formed on the gate insulating layer 36.

In step S715, the sources 342 and the drains 343 of the TFTs 34 may be fabricated in the same step with the data lines 13. The sources 342 and the drains 343 may be electrically connected to the active layer 344. The sources 342 may be electrically connected with the data lines 13.

After step S715, a passivation layer 37 for covering the sources 342 and the drains 343 of the TFTs 34, and the data lines 13 may be formed. Via holes 33 may be formed in the passivation layer 37. The locations of the via holes 33 may correspond to the locations of the drains 343 of the TFTs 34. Further, pixel electrodes 34 may be fabricated on the passivation layer 37. The pixel electrodes 35 may be electrically connected to the drains 343 of the TFTs 34 through the via holes 33.

Further, in step S713, the process to form via holes 33 in the insulating layer 32 may include forming the via holes 33 in the insulating layer 32, where the locations of the via holes 33 may correspond to the same location on each common electrode pattern 16.

By forming the via holes 33 in the insulating layer 32, the locations of the via holes 33 corresponding to the same location on each common electrode pattern 16, the via holes 33 in the insulating layer 32 may correspond to the same location on the common electrode patterns 16. The electrical properties of each common electrode pattern 16 may be consistent or same. The display of the touch display panel may be uniformed. The display performance of the touch display panel may be improved.

In some embodiments, the conductive lines 31 may be common electrode lines.

In some embodiments, the common electrode lines may be arranged to be parallel to the gate lines 14. The orthogonal projection of the common electrode lines on the first substrate 11 may be positioned between the orthogonal projection of two adjacent common electrode patterns 16 on the first substrate 11. The orthogonal projection of the common electrode lines may have no overlap with the orthogonal projection of the gate lines 14 on the first substrate 11.

The configuration described above may be used to reduce the capacitance between the touch-driving electrodes and the gate lines, and the capacitance between the touch-driving electrodes and the data lines. The configuration may also be used to reduce the capacitance between the capacitance between the touch-driving electrodes and the common electrode patterns. The sensitivity, of the touch display panel, to touch motions may be improved. The power consumption of the touch display panel may be reduced.

In some embodiments, the common electrode lines and the gate lines 14 may be formed through the same patterning process. By using the same patterning process to form the gate lines 14 and the common electrode lines, the fabrication process of the touch display panel may be simplified.

In some embodiments, the process illustrated in FIG. 7 may further include the fabrication of connecting structures

60. Connecting structures 60 may be positioned in the spaces between two adjacent common electrode patterns 16 along the column direction, i.e., the direction along which the data lines 13 are arranged. As shown in FIG. 6, two connecting structures 60 are each positioned at one end of the two adjacent common electrode patterns 16 between the two adjacent common electrode patterns 16 for connecting the two adjacent common electrode patterns 16 at each end. Common electrode patterns 16 corresponding to subpixel regions 15 in at least one row may be electrically connected through the connecting structures 60 between two adjacent common electrode patterns 16. The connecting structures 60 and the common electrode patterns 16 may be fabricated through one patterning process.

In some embodiments, touch-sensing electrodes 18 may be formed in step S72. The process to form the touch-sensing electrodes 18 may include fabricating touch-sensing electrodes on a second substrate 12. The second substrate 12 may be facing the first substrate 11.

Another aspect of the present disclosure provides a method for driving a touch display panel. The method may be used to drive any one of the touch display panels fabricated by the disclosed method used for fabricating touch display panels. The method may include a time-sharing driving process. Specifically, the method may include the following steps.

First, a period for display a frame, i.e., a frame, may be divided into at least one display period and at least one touch period.

In a display period, a common electrode signal may be applied on the touch-driving electrodes by a processing unit.

In a touch period, a touch-driving signal may be applied on the touch-driving electrodes by the processing unit. The processing unit may also determine the locations of touch motions by detecting the capacitance changes of the touch-sensing electrodes.

According to the method for driving the touch display panel, one frame may be divided into at least one display period and at least one touch period. In a display period, a common electrode signal may be applied on the touch-driving electrodes by the processing unit. In a touch period, a touch-driving signal may be applied on the touch-driving electrodes by the processing unit. The processing unit may also determine the locations of touch motions by detecting the capacitance changes of the touch-sensing electrodes. That is, in the embodiments of the present disclosure, the touch-driving electrodes may be used as common electrodes (or common electrode patterns), and the common electrodes may be used as touch-driving electrodes. The fabrication process of the touch display panel may be simplified, and the resulting touch display panel may be thinner.

Figure 8:
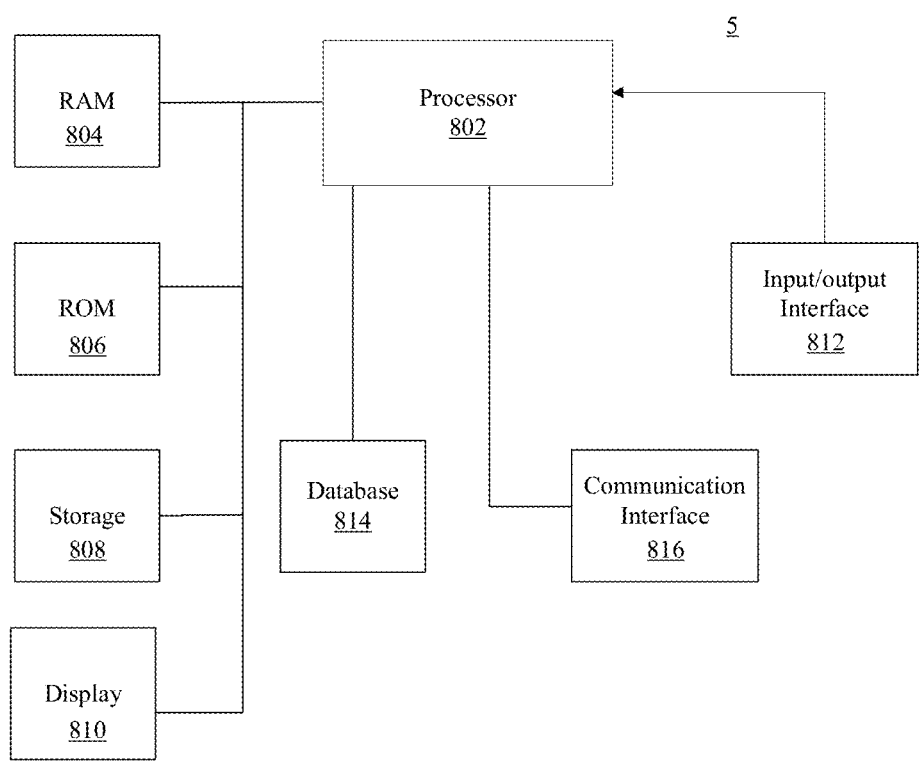
FIG. 8 illustrates a block diagram of a processing unit used in the embodiments of the present disclosure.

FIG. 8 illustrates the block diagram of the processing unit 800 used in the embodiments of the present disclosure. The processing unit 800 or system may accept, process, and execute commands from the touch display panel. The processing unit 800 may include any appropriately configured computer system. As shown in FIG. 8, the processing unit 800 may include a processor 802, a random access memory (RAM) unit 804, a read-only memory (ROM) unit 806, a storage unit 808, a display 810, an input/output interface unit 812, a database 814; and a communication interface 816. Other components may be added and certain devices may be removed without departing from the principles of the disclosed embodiments.

Processor 802 may include any appropriate type of general purpose microprocessor, digital signal processor or microcontroller, and application specific integrated circuit (ASIC). Processor 802 may execute sequences of computer program instructions to perform various processes associated with processing unit 800. Computer program instructions may be loaded into RAM 804 for execution by processor 802 from read-only memory 806, or from storage 808. Storage 808 may include any appropriate type of mass storage provided to store any type of information that processor 802 may need to perform the processes. For example, storage 808 may include one or more hard disk devices, optical disk devices, flash disks, or other storage devices to provide storage space.

Display 810 may provide information to a user or users of the processing unit 800. Display 810 may include any appropriate type of computer display device or electronic device display (e.g., CRT or LCD based devices). Input/output interface 812 may be provided for users to input information into processing unit 800 or for the users to receive information from processing unit 800. For example, input/output interface 812 may include any appropriate input device, such as a keyboard, a mouse, an electronic tablet, voice communication devices, or any other optical or wireless input devices. Further, input/output interface 812 may receive from and/or send to other external devices.

Further, database 814 may include any type of commercial or customized database, and may also include analysis tools for analyzing the information in the databases. Database 814 may be used for storing information for semiconductor manufacturing and other related information. Communication interface 816 may provide communication connections such that processing unit 800 may be accessed remotely and/or communicate with other systems through computer networks or other communication networks via various communication protocols, such as transmission control protocol/internet protocol (TCP/IP), hyper text transfer protocol (HTTP), etc.

In one embodiment, a user may touch the touch display panel. The processor 802 may accept, process, and execute the commands to obtain data from the touch-sensing electrodes to configure the touch motion. Suitable data may be stored in ROM 806 and storage 808 to be processed. After the data is processed, the result, e.g., a location, of the touch motion can be obtained. The result can be returned to the user via the display 810 or the input/output interface 812.

Another aspect of the present disclosure provides a touch display apparatus. The touch display apparatus may incorporate one or more of the above-mentioned touch display panels. The touch display apparatus may also incorporate one or more of the touch display panels fabricated using the disclosed method for fabricating touch display panels.

The touch display apparatus according to the embodiments of the present disclosure can be used in any product with display functions such as an electronic paper, a mobile phone, a tablet, a television, a monitor, a laptop, a digital frame, and a navigation device. The specific type of the touch display apparatus should not be limited by the embodiments of the present disclosure.

It should be understood that the above embodiments disclosed herein are exemplary only and not limiting the scope of this disclosure. Without departing from the spirit and scope of this invention, other modifications, equivalents, or improvements to the disclosed embodiments are obvious to those skilled in the art and are intended to be encompassed within the scope of the present disclosure.

What is claimed is:

1. A touch display panel, comprising:
   a first substrate;
   a plurality of data lines;
   a plurality of gate lines;
   a plurality of subpixel regions arranged in an array defined by the plurality of data lines and the plurality of gate lines on the first substrate, each subpixel region including a common electrode pattern;
   a plurality of touch-driving electrodes, each formed by electrically connected common electrode patterns corresponding to at least one row of subpixel regions; and
   a plurality of touch-sensing electrodes, wherein the plurality of touch-driving electrodes and the touch-sensing electrodes are for detecting a touch motion on the touch display panel,
   wherein:
      common electrode patterns in one touch-driving electrode are electrically connected through a conductive line, and
      each common electrode pattern is electrically connected to the conductive line by:
         a via hole formed in an insulating layer between the touch-driving electrode and the conductive line, and
         a coupling line electrically coupling the via hole to the conductive line.

2. The touch display panel according to claim 1, wherein the plurality of touch-sensing electrodes and the plurality of touch-driving electrodes are distributed in different layers and are electrically insulated from each other, an orthogonal projection of the plurality of touch-sensing electrodes on the first substrate intersecting with an orthogonal projection of the plurality of touch-driving electrodes on the first substrate.

3. The touch display panel according to claim 1, wherein the conductive line is a common electrode line for transmitting common electrode signals to a corresponding touch-driving electrode in a display period of one frame.

4. The touch display panel according to claim 3, wherein:
   the common electrode lines are parallel to the gate lines; and
   an orthogonal projection of a common electrode line on the first substrate is between an orthogonal projection of two adjacent common electrode patterns on the first substrate, the orthogonal projection of the common electrode line on the first substrate being separate from an orthogonal projection of a gate line on the first substrate.

5. The touch display panel according to claim 4, wherein the gate lines and the common electrode lines are in a same layer and made of a same material.

6. The touch display panel according to claim 1, wherein a position of each via hole corresponds to a same location on each common electrode pattern, the via holes corresponding to the common electrode patterns according to a one-to-one relation.

7. The touch display panel according to claim 1, wherein common electrode patterns in at least one touch-driving electrode are connected through connecting structures.

8. The touch display panel according to claim 7, wherein two connecting structures are each positioned at one end of the two adjacent common electrode patterns and between the two adjacent common electrode patterns for connecting the two adjacent common electrode patterns.

9. The touch display panel according to claim 8, wherein the connecting structures and the common electrode patterns are in a same layer and made of a same material.

10. The touch display panel according to claim 1, further including a second substrate facing the first substrate, the plurality of touch-sensing electrodes being distributed on the second substrate.

11. The touch display panel according to claim 1, further including a signal processor configured to provide the common electrode signal and the touch-driving signal, and determine a location of the touch motion.

12. A method for driving the touch display panel according to claim 1, comprising:
   a signal processor dividing a frame into at least one display period and at least one touch period;
   in a display period, the signal processor applying a common electrode signal on the touch-driving electrodes; and
   in a touch period, the signal processor applying a touch-driving signal on the touch-driving electrodes and determining locations of touch motions by detecting capacitance change on the touch-sensing electrodes.

13. A touch display apparatus, including one or more of the touch display panels according to claim 1.

14. A method for fabricating a touch display panel, comprising:
   forming a plurality of data lines and a plurality of gate lines on a first substrate, wherein a plurality of subpixel regions arranged in an array are defined by the plurality of data lines and the plurality of gate lines forming a plurality of conductive lines and a plurality of coupling lines on the first substrate, each of the coupling lines being electrically connected to one of the conductive lines;
   forming an insulating layer on the plurality of conductive lines, the plurality of coupling lines, and the plurality of gate lines;
   forming a plurality of via holes in the insulating layer, each of the via holes being over and electrically connected to one of the coupling lines;
   forming common electrode patterns on the insulating layer, each of the common electrode patterns being over one of the via holes and electrically connected to a corresponding one of the plurality of conductive lines by the one of the via holes and one of the coupling lines, each subpixel region including one of the common electrode patterns, and common electrode patterns corresponding to at least one row of subpixel regions being electrically connected to form a touch-driving electrode; and
   forming a plurality of touch-sensing electrodes, wherein the plurality of touch-sensing electrodes and a plurality of touch-driving electrodes are distributed in different layers and are electrically insulated from each other, an orthogonal projection of the plurality of touch-sensing electrodes on the first substrate intersecting with an orthogonal projection of the plurality of touch-driving electrodes on the first substrate.

15. The method according to claim 14, further including:
   forming the plurality of data lines on the first substrate that includes the common electrode patterns.

16. The method according to claim 15, wherein a position of each via hole corresponds to a same location on each common electrode pattern, the via holes corresponding to the common electrode patterns according to a one-to-one relation.

17. The method according to claim 15, wherein the conductive lines are common electrode lines.

18. The method according to claim 17, wherein:
- the common electrode lines are parallel to the gate lines; and
- an orthogonal projection of a common electrode line on the first substrate is between an orthogonal projection of two adjacent common electrode patterns on the first substrate, the orthogonal projection of a common electrode line on the first substrate having no overlap with an orthogonal projection of a gate line on the first substrate.

19. The method according to claim 15, further including forming connecting structures in a same patterning process as the common electrode patterns, wherein:
- common electrode patterns corresponding to at least one row of subpixel regions are connected through connecting structures; and
- two connecting structures are each positioned at one end of the two adjacent common electrode patterns and between the two adjacent common electrode patterns for connecting the two adjacent common electrode patterns.

\* \* \* \* \*